US012202012B2

(12) United States Patent
Schitthelm

(10) Patent No.: US 12,202,012 B2
(45) Date of Patent: Jan. 21, 2025

(54) CLASSIFYING ITEMS

(71) Applicant: Körber Supply Chain Logistics GmbH, Constance (DE)

(72) Inventor: Oliver Schitthelm, Nuremberg (DE)

(73) Assignee: KÖRBER SUPPLY CHAIN LOGISTICS GMBH, Constance (DE)

( * ) Notice: Subject to any disclaimer, the term of this patent is extended or adjusted under 35 U.S.C. 154(b) by 0 days.

(21) Appl. No.: 18/546,106

(22) PCT Filed: Jan. 25, 2022

(86) PCT No.: PCT/EP2022/051596
§ 371 (c)(1),
(2) Date: Aug. 11, 2023

(87) PCT Pub. No.: WO2022/171432
PCT Pub. Date: Aug. 18, 2022

(65) Prior Publication Data

US 2024/0116081 A1 Apr. 11, 2024

(30) Foreign Application Priority Data

Feb. 12, 2021 (EP) .................................... 21156868

(51) Int. Cl.
*B07C 5/342* (2006.01)
*B07C 5/36* (2006.01)

(52) U.S. Cl.
CPC .............. *B07C 5/342* (2013.01); *B07C 5/362* (2013.01)

(58) Field of Classification Search
CPC ................................ B07C 5/342; B07C 5/362
See application file for complete search history.

(56) References Cited

U.S. PATENT DOCUMENTS

| | | | | |
|---|---|---|---|---|
| 6,694,220 B1 * | 2/2004 | Tanz | B65G 43/08 700/226 |
| 2002/0005333 A1 * | 1/2002 | Mondie | B65G 47/28 198/618 |
| 2019/0247891 A1 * | 8/2019 | Kumar | B07C 5/3422 |
| 2021/0047132 A1 * | 2/2021 | Sines | B65G 47/31 |

FOREIGN PATENT DOCUMENTS

| | | | |
|---|---|---|---|
| DE | 102015005443.0 | A | 12/2016 |
| EP | 2944591 | A1 | 11/2015 |
| WO | 0076887 | A1 | 12/2000 |
| WO | 2017007340 | A1 | 1/2017 |
| WO | 2019.222128 | A1 | 11/2019 |

OTHER PUBLICATIONS

European Patent Office; International Search Report; Apr. 6, 2022; Entire document.

* cited by examiner

*Primary Examiner* — Michael McCullough
*Assistant Examiner* — Kalyanavenkateshware Kumar
(74) *Attorney, Agent, or Firm* — Price Heneveld LLP

(57) ABSTRACT

An apparatus for classifying items in a logistic process including an item manipulating device that includes a plurality of conveying elements for moving items, a vision system configured to produce visual information of at least one item of the items that performs a movement caused by conveying elements of the plurality of conveying elements, and a control system configured to receive the visual information and to perform a classification of the at least one item dependent on the visual information into one more classes.

18 Claims, 1 Drawing Sheet

CLASSIFYING ITEMS

BACKGROUND

The invention relates to the technical field of classifying items in a logistic process, such as recognizing and classifying items that are not conveyable by a conveyor system or sorting system.

Items arriving at sortation systems, e.g. at parcel sortation centers or at luggage sortation systems in an airport, come in a wide variety of sizes, shapes and weights. Therefore, there are items that cannot be handled by the standard equipment. As of today, the pre-sortation to determine if an item can run on a given system is usually done manually. Unconveyable items are usually extracted manually. The current solution thus involves humans that do a manual sorting. It would be desirable to require less human power needed in a plant.

WO2019161983A1 discloses a discloses a method for recognizing non conveyable items using a light curtain.

Unconveyable items does not mean that the items are entirely unconveyable by a given machine, but also that they will not be conveyed in predictable or otherwise desirable manner, when exposed to the conveying elements of the machine. Unconveyable items (often simply called nonconveyables) are a known problem in the art and can e.g. be characterized as items that will cause delay or reduce the throughput of the machine or cause other disturbances, such as items that will roll on the conveying elements and/or fall down from a conveyor.

It is the object of the present invention to automate classification of items in a logistic process.

SUMMARY

In accordance with the invention there is provided an apparatus for classifying items in a logistic process. The apparatus comprises an item manipulating device, a vision system, and a control system. The item manipulating device comprises a plurality of conveying elements for moving items. The vision system is adapted to produce visual information of at least one item that performs a movement caused by conveying elements of the plurality of conveying elements. The control system is adapted to receive said visual information, and to perform a classification of the at least one item dependent on said visual information.

According to an embodiment, the control system is adapted to classify the item into at least one of at least two classes (e.g. conveyables and nonconveyables).

According to an embodiment, the item manipulating device comprises a singulator that is adapted to singulate unsingulated items with the conveying elements. This results in the additional advantage, that additionally to singulating the item from other items, the singulator can also be used to classify items.

According to an embodiment, the conveying elements are individually drivable. This allows to manipulate the item in a more variable manner, therefore allowing to perform the classification in a more variable manner.

According to an embodiment, the control system is adapted to control the plurality of conveying elements for causing the item to perform said movement and/or singulating the item. This allows the control system to perform the classification of the item using feedback, thus allowing for more versatile methods of classification. Also, this allows the control system to adapt the movement and/or the singulation of the item depending on the visual information.

According to an embodiment, the control system is adapted to deduce from said visual information movement information. The movement information describes the movement of the at least one item. For example, the movement information can comprise information related to the velocity and/or acceleration of the item. According to this embodiment, the control system is furthermore adapted to perform said classification dependent on the movement information. For example, the control system is adapted to detect when a movement of the item observed by the vision system deviates from an expected movement which the control system automatically deduces from the how it actually controls the moving elements of the item manipulating device. These types of embodiments provide the advantage, that a classification, e.g. whether the item is conveyable or not, can be automatically performed without executing complicated analysis of the shape of the item.

According to an embodiment, the item manipulating device is a conveyor system that is suited to convey conveyable items, and the conveying elements are conveyors of that conveying system, wherein the control system classifies the at least one item based on the shape, color, and/or movement of the at least one item.

According to an embodiment, at least one of the classes into which the at least one item can be classified describes whether the item is conveyable, or whether the item is not conveyable, e.g. by the apparatus for classifying items it-self or by a subsequent conveying system.

According to an embodiment, the at least one classes into which the at least one item can be classified comprises classes selected from the group of:

- regulars (i.e. regular items, such as parcels),
- polybags (i.e. plastic bags, usually closed or sealed),
- unstable items (items that are unstable),
- oversized items (items that are too large to be processed by the apparatus or by subsequent item processing equipment),
- undersized items (items that are too small to be processed by the apparatus or by subsequent item processing equipment),
- damaged Goods (goods that are damaged),
- non-conveyables (items that are not conveyable or not reliably conveyable by the apparatus or by subsequent item processing equipment),
- singulation errors (items that were not properly singulated from other items, e.g. items that are too close to each other so that they cannot be processed or not be reliably processed by the apparatus or by subsequent item processing equipment).

This allows for a versatile kind of classification and subsequent pre-sortation based on the classification.

According to an embodiment, the apparatus for classifying items comprises a flow splitter arranged downstream of the item manipulating device. The flow splitter is connected to the control system, and the control system is adapted to route the at least one item based on its classification previously performed by the control unit. This allows to effectively presort the items to be processed on different sortation system. Furthermore, this allows to sort out items that cannot be processed on a subsequent machine. For example, non conveyables and/or oversized items can be sorted out.

According to an embodiment, the control system is programmed with at least one deterministic algorithm. For example, the algorithm can be adapted to classify the item, or the algorithm can perform a partial task for classifying the item.

According to an embodiment, the control system comprises a trained system for performing said classification. Trained systems allow for a flexible adaption to different classification needs, without programming a sophisticated detailed algorithm.

According to an embodiment, the control system comprises a trainable system for getting trained in order to perform said classification. This allows to efficiently adapt the apparatus to specific need, e.g. at a site of a logistic enterprise.

According to an embodiment, the apparatus for classifying items comprises tracking means for tracking the at least one item as the item is conveyed from the item manipulating de-vice downstream, e.g. to a flow splitter.

According to an embodiment, the tracking means comprise a vision system that is adapted to continuously track the item along its path. This allows for a detailed control of the item along its path.

According to another embodiment, the tracking means comprise means for recognizing the at least one item using a reader equipment that is adapted to read an identifier that is associated with each item, such as a bar code, a QR code, or a RFID-tag. For example, a reader of the reader equipment can be arranged at the flow splitter. For each item that arrives at the flow splitter, the reader reads the identifier and transmits the identifier to the control system. The control system then associates the identifier of an item with a data set of the same item that was previously generated or completed with the classification of the item at the item manipulating device.

According to another embodiment, the tracking means comprise means for recognizing the at least one item based on finger-printing, such as shape, color, and/or pattern recognition).

According to another embodiment, the tracking means comprise virtual tracking means, which are implemented in the control system, e.g. in the form of an executable computer program product, which tracks the item based on information deduced from signals controlling conveying equipment which conveys the item.

In an embodiment the vision system is comprised by the item manipulating device. In another embodiment, the vision system is a system external from the item manipulating device. In a further embodiment, the flow splitter also comprises a vision system. In another embodiment, the vision systems of the item manipulating device and the flow splitter can be interconnected to an overarching vision system. The interconnection can for example be achieved by controlling the vision systems by the control system.

In accordance with the invention there is provided a method for classifying items in a logistic process, in which at least one item is moved by means of an item manipulating de-vice that comprises a plurality of conveying elements 3, such as for example a singulator. Visual information of the at least one item is produced while the item performs a movement caused by at least some of the conveying elements of the plurality of conveying elements. The at least one item is classified depending on the visual information by a control system.

According to an embodiment, the conveying elements 3 are individually driven to singulate the at least one item. This allows for causing versatile movements of the item to perform the classification.

According to an embodiment, the control system deduces from said visual information movement information describing the movement of the at least one item and performs perform said classification dependent on the movement information.

According to an embodiment, the at least one item is routed into one of at least two directions by a flow splitter arranged downstream of the item manipulating device.

According to an embodiment, at least one of the classes into which the at least one item can be classified describes whether the item 5 is conveyable or whether the item is not conveyable According to an embodiment, the at least one classes into which the at least one item 5 can be classified comprises one or more classes selected from the group of: regulars, polybags, unstable items, oversized items, undersized items, dam-aged goods, non-conveyables, singulation errors.

According to an embodiment, the control system controls the plurality of conveying elements to cause the item to perform said movement and/or to singulate the item.

According to an embodiment, the classification is performed using a deterministic algorithm executed by the control system.

According to an embodiment, the classification is performed using a trained system and/or a trainable system operated by the control system.

According to an embodiment, the at least one item is automatically tracked as it is conveyed from the item manipulating device downstream.

The advantageous features of the apparatus for classifying items, and the method for classifying items can generally be combined.

BRIEF DESCRIPTION OF THE DRAWINGS

Embodiments of the invention are now described, by way of ex-ample only, with reference to the accompanying drawings, of which.

DETAILED DESCRIPTION

Figure 1:
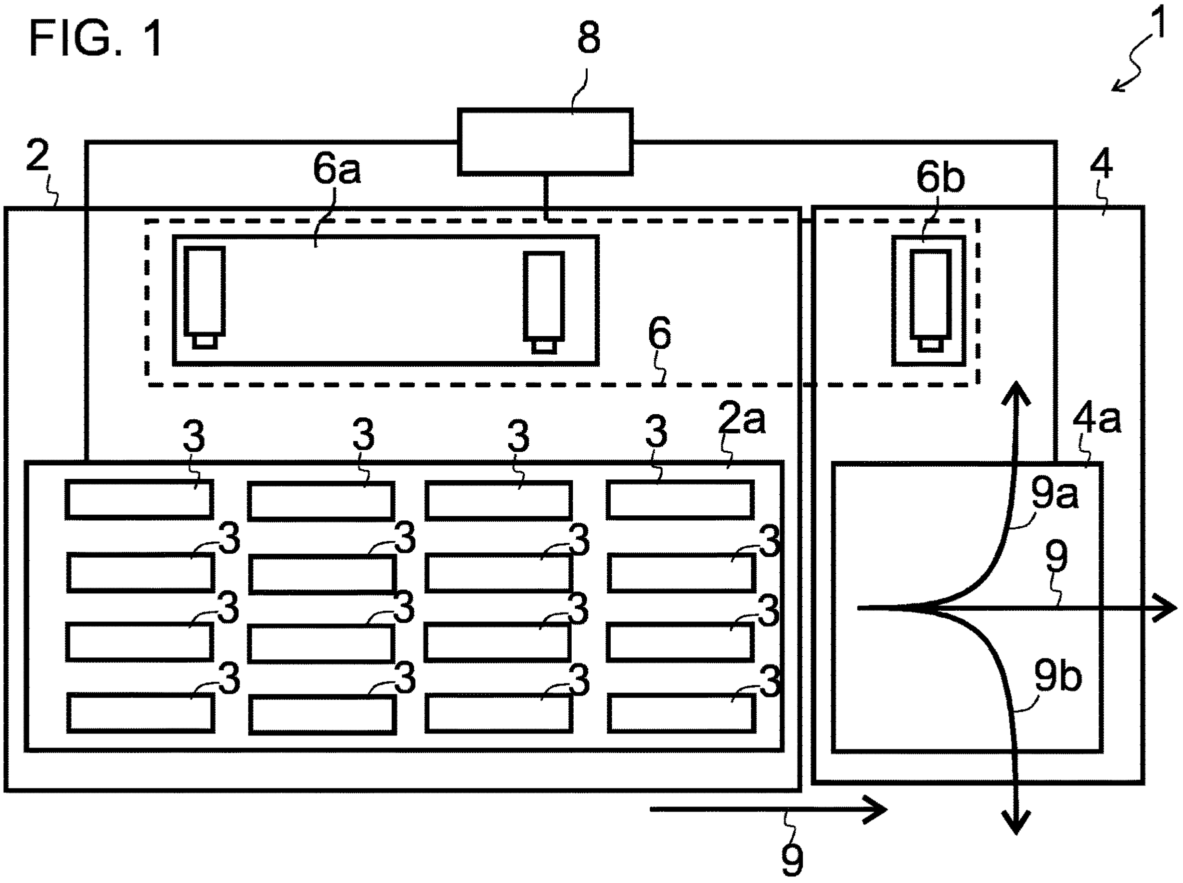
FIG. 1 shows a scheme of an apparatus for classifying items in a logistic process according to an embodiment of the invention.
Figure 2:
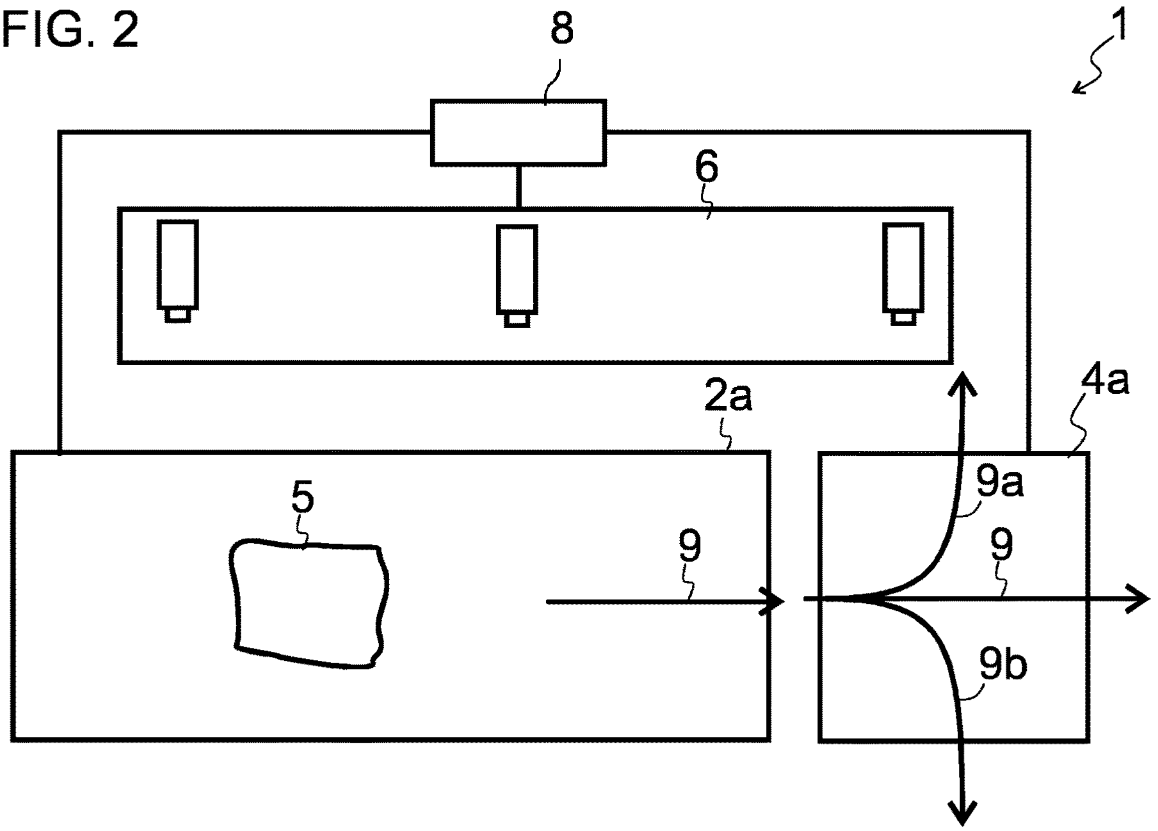
FIG. 2 shows a scheme of the apparatus of FIG. 1, in which at least one item is being processed.

FIGS. 1 and 2 show schemes of an apparatus 1 for classifying items 5 in a logistic process according to an embodiment of the invention. The apparatus 1 comprises the main item flow direction 9. The apparatus 1 comprises an item manipulating device 2 that is implemented as a vision controlled singulator system 2, and a control system 8. The vision controlled singulator system 2 comprises a singulator **2*a* comprising a plurality of individually drivable conveying elements 3, such as small conveyors or rollers, for singulating unsingulated items and/or items that are arranged in bulk. The control system 8 is adapted to control the plurality of conveying elements 3 for causing the items to be moved. The singulator system 2 comprises the vision system 6*a* to produce visual information of at least one item 5 that performs a movement caused by conveying elements 3 of the plurality of conveying elements 3, e.g. while the at least one item 5 is being singulated by the conveying elements 3. The control system 8 is adapted to receive said visual information, and to control the conveyor elements 3 based on said visual in-formation in order to singulate the items. In addition, the control system 8 is adapted to deduce from said visual information movement information describing the movement of the at least one item 5, and, based on the movement information, to perform a classification of the at least one item 5** into at least one of at least two classes, for example into conveyable items and/or non-conveyable items, meaning that the item is conveyable or non-conveyable by the apparatus or by a sub-sequent processing system. The control system is thus adapted to perform said classification based on said visual information.

According to an embodiment, the apparatus combines the vision capabilities of a singulator with the routing capability of a flow splitter. The vision system of the singulator performs an object classification into one or more of the following classes:

Regulars,
Polybags,
Unstable items,
Oversized items,
Undersized items,
Damaged Goods,
Non conveyables,
Singulation errors.

According to further embodiments, based on the movement information, the at least one classes into which the at least one item 5 can be classified comprises one or more of the above classes.

This classification then is used to decide where to route these items with the attached flow splitter. The flow splitter can be positioned downstream the main item flow direction 9 at a distance or be directly attached to the singulator. Possible configurations can for example be two- or three-way splits where usually the oversized or non-conveyable items will be conveyed straight through while items for processing are routed out to their processing systems.

The vision system can be programmed with deterministic algorithms or use deep learning approaches for the classification.

According to further embodiments, the flow splitter can be directly controlled by the singulator or a common controls system by tracking the items leaving the singulator and give them a property containing the object class.

The apparatus 1 further comprises a video controlled flow splitter system 4 arranged downstream of the item manipulating device 2 and connected to the control system 8 for routing, e.g. for sorting out, the at least one item 5 based on its classification previously performed by the control unit 8. The flow splitter is adapted to route items in one of two or more directions 9, 9*a*, 9*b* according to their classification. In an embodiment, the flow splitter system 4 is adapted to route the items in one of two directions 9, 9*b*, according to their classification, wherein the classification e.g. rep-resents whether the item is conveyable or not. The video-controlled flow splitter system 4 comprises a flow splitter 4*a* and a vision system 6*b*.

In order to support to route or sort out the at least one item 5, the apparatus comprises means for tracking the at least one item 5 as it is conveyed from the singulator 2*a* downstream to the flow splitter 4. Tracking can be by continuously tracking, e.g. by a vision system 6 adapted to track the at least one item 5 along the path from the singulator 2*a* to the flow splitter 4*a*. In order to do so, the vision system 6 comprises vision systems 6*a*, 6*b*, and potentially one or more further vision systems in order to seamlessly track the items.

In a variant the vision system 6 does not need to seamlessly track the at least one item from the singulator 2*a* to the flow splitter 4*a*. In this variant, the vision system 6*b* sends visual information of the items at the location at or before the flow splitter 4*a* to the control system 8, and the control system 8 is adapted to identify the at least one item, e.g. based on a sign attached to the item, or based on fingerprinting technology, as will be outlined in the next paragraphs.

According to a variant, the means for tracking the at least one item comprises a code based identification system, e.g. a bar code system, a QR code system, or an RFID system, that physically connects the item with a code in order to identify it at the singulator 2*a* or other item manipulating device, and that identifies each item as well at the flow splitter 4 in order to route it according to its classification.

According to another variant, the means for tracking the at least one item comprises a fingerprinting system. A finger-printing system, e.g. is a system that are adapted to track an item based on recognition of the visual information, e.g. based on shape recognition, pattern recognition, color recognition.

According to another variant, the means for tracking the at least one item can also be or include a system for virtually tracking the item, which is adapted to calculate the position of an item, based on controlling information, i.e. based on information about how the control system 8 has driven convey- or systems subsequent to the singulator 2*a* in order to transport the item to the flow splitter. The advantage of the virtual tracking is that it can be implemented in the control system 8 and does not require additional hardware.

According to an embodiment, the vision system 6, 6*a*, and/or 6*b* comprises a camera system, meaning that it comprises at least one camera. This allows to process a large variety of information, such as color, improving recognition e.g. of partially round shapes and conjoined items. In a variant, the vision system 6, 6*a*, and/or 6*b* comprises a light curtain system.

In an embodiment the vision system 6*a* is comprised by the item manipulating device or singulator system 2. In another embodiment, the vision system 6*a* is a system external from the singulator system 2. In a further embodiment, the flow splitter 4*a* also comprises a vision system 6*b*. In another embodiment, the vision systems 6*a*, 6*b* are interconnected, and comprised by an overarching vision system 6. The interconnection can for example be achieved by controlling the vision systems 6*a*, 6*b* by the control system 8.

In a variant embodiment, the item manipulating device 2 is not a singulator, but simply a conveyor system. The conveyor system that is suited to convey conveyable items, and the plurality of conveying elements is at least one or two or more conveyors of that conveying system, wherein the control system classifies the at least one item based on the shape, color, and/or movement of the at least one item.

Referring to the embodiments of FIGS. 1 and 2, unsingulated items 5 arrive at the singulator 2*a*, where they are singulated by individually driving the conveying elements 3. The process of singulating the items 5 is supported with visual information produced by the vision system 6*a*. The visual information is additionally used for classifying the at least one item 5, wherein the control system deduces from said visual information movement information describing the movement of the at least one item 5. The control system performs said classification dependent on the movement information. Alter-natively or additionally, the classification can be performed based on static information derived from the visual information, such as shapes, contours, and/or colors in the visual information.

The at least one item is then conveyed downstream to the flow splitter 4, 4*a*. the flow splitter routes the at least one item 5 based on its classification into one of at least two directions 9, 9*a*, 9*b*.

According to some embodiments, the control system 8 is programmed with at least one deterministic algorithm for performing said classification. According to further embodiments, the control system 8 comprises a trained system for performing said classification and/or a trainable system for getting trained to perform said classification.

The invention claimed is:

1. An apparatus for classifying items in a logistic process, comprising:

an item manipulating device comprising a plurality of conveying elements for moving items;

a vision system configured to produce visual information of at least one item of the items that performs a movement caused by conveying elements of the plurality of conveying elements; and a control system configured to receive the visual information and to perform a classification of the at least one item into one or more classes dependent on the visual information;

wherein at least one class of the one or more classes into which the at least one item can be classified describes whether the at least one item is conveyable or whether the at least one item is not conveyable.

2. The apparatus of claim 1, wherein the conveying elements are individually drivable.

3. The apparatus according to claim 2, wherein the control system is configured to control the plurality of conveying elements for causing the at least one item to perform the movement and/or singulating the at least one item.

4. The apparatus according to claim 3, wherein the control system is configured to deduce from the visual information movement information describing the movement of the at least one item, and to perform the classification dependent on the movement information.

5. The apparatus according claim 4, wherein the one or more classes is selected from the group of: regulars, polybags, unstable items, oversized items, undersized items, damaged goods, non-conveyables, and singulation errors.

6. The apparatus according to claim 5, further comprising: a flow splitter arranged down-stream of the item manipulating device and connected to the control system for routing the at least one item based on the classification of the at least one item.

7. The apparatus according to claim 1, wherein the control system is programmed with at least one deterministic algorithm.

8. The apparatus according to claim 1, wherein the control system further comprises a trained system for performing the classification and/or a trainable system configured to be trained to perform the classification.

9. The apparatus according to claim 1, further comprising: a tracker configured to track the at least one item as the at least one item is conveyed from the item manipulating device downstream.

10. The apparatus according to claim 1, wherein the control system is configured to control the plurality of conveying elements for causing the at least one item to perform the movement and/or singulating the at least one item.

11. The apparatus according to claim 1, wherein the control system is configured to deduce from the visual information movement information describing the movement of the at least one item, and to perform the classification dependent on the movement information.

12. The apparatus according to claim 1, wherein the one or more classes is selected from the group of: regulars, polybags, unstable items, oversized items, undersized items, damaged goods, non-conveyables, and singulation errors.

13. The apparatus according to claim 1, further comprising: a flow splitter arranged down-stream of the item manipulating device and connected to the control system for routing the at least one item based on the classification of the at least one item.

14. A method for classifying items in a logistic process, comprising:

moving at least one item with an item manipulating device including a singulator, the item manipulating device comprising a plurality of conveying elements;

producing visual information of the at least one item while the at least one item performs a movement caused by conveying elements of the plurality of conveying elements vision system; and classifying the at least one item into one or more classes depending on the visual information by a control system;

wherein at least one of the classes into which the at least one item can be classified describes whether the item is conveyable or whether the item is not conveyable.

15. The method of claim 14, wherein the conveying elements are individually driven in order to singulate the at least one item.

16. The method of claim 14, wherein the control system deduces from the visual information movement information describing the movement of the at least one item and performs the classification dependent on the movement information.

17. The method of claim 14, wherein a flow splitter arranged downstream of the item manipulating device routes the at least one item based on the classification of the at least one item into one of at least two directions.

18. The method of claim 14, wherein the one or more classes is selected from the group of: regulars, polybags, unstable items, oversized items, undersized items, damaged goods, non-conveyables, and singulation errors.

* * * * *